Patented Feb. 23, 1954

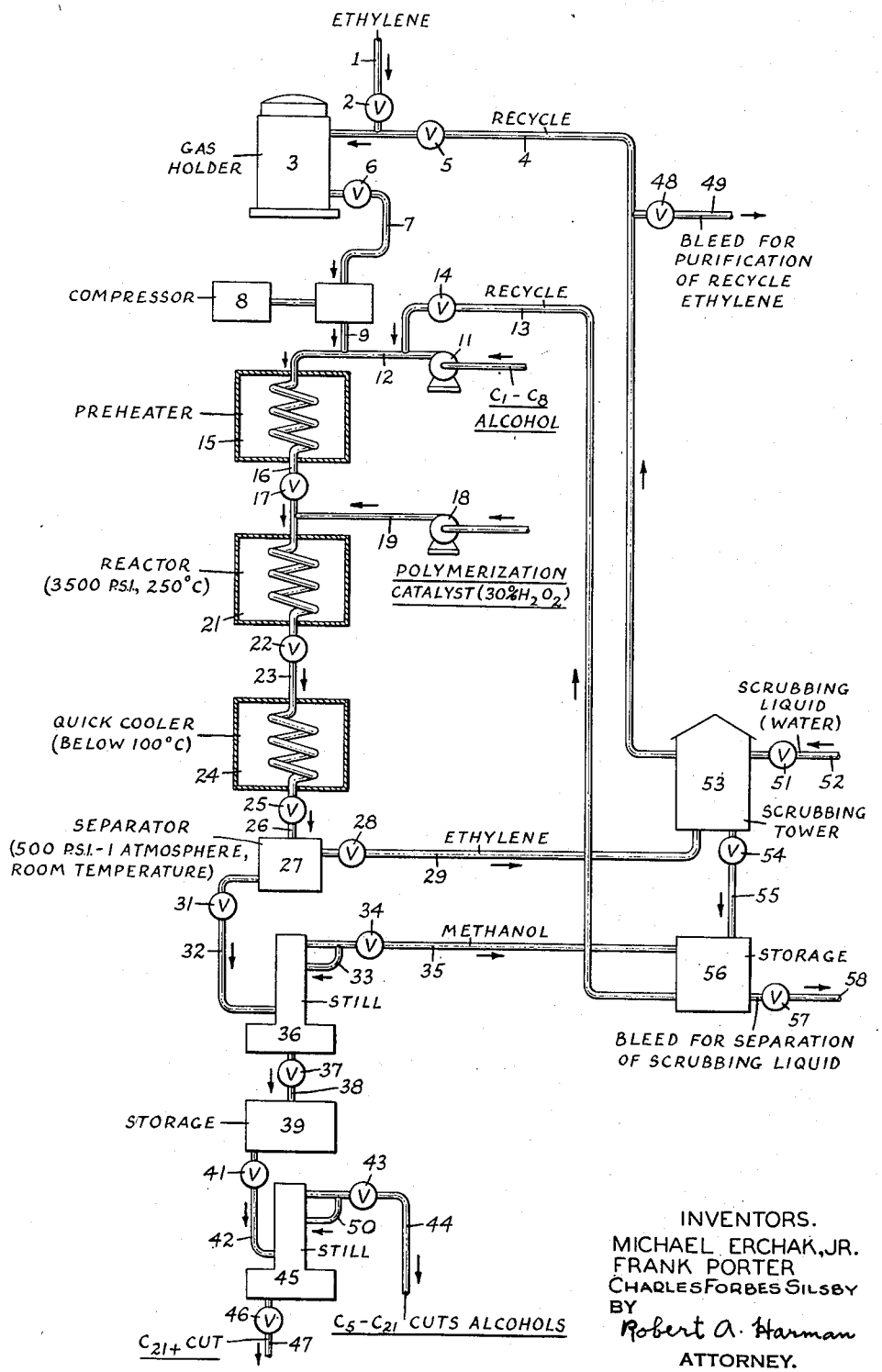

2,670,386

UNITED STATES PATENT OFFICE 2,670,386

PRODUCTION OF ALCOHOLS

Michael Erchak, Jr., Morris Plains, and Frank Porter, Morristown, N. J., and Charles Forbes Silsby, Scarsdale, N. Y., assignors to Allied Chemical & Dye Corporation, New York, N. Y., a corporation of New York Application August 18, 1949, Serial No. 111,067

3 Claims. (Cl. 260—642)

This invention relates to process for manufacture of mixtures of certain saturated monohydric alcohols containing from about 5 to about 33 carbon atoms, more particularly from 5 to 21 carbon atoms.

The principal object of our invention is to recover monohydric saturated alcohols of carbon content chiefly between 5 and 21 carbon atoms with minimum formation during product recovery of higher molecular weight materials. Other objects and advantages will appear hereinafter.

It is known that by reaction between ethylene and saturated monohydric alcohol containing not more than 8 carbon atoms under suitable conditions of temperature, pressure, catalyst and ethylene:alcohol mol ratio, alcoholic products containing largely $C_5$–$C_{33}$ saturated monohydric alcohols are formed. For example, at a temperature of about 245° C. with a pressure of about 3000 p. s. i., with a mol ratio of methanol:ethylene of about 4:1, using about 1 weight per cent of 30% aq. hydrogen peroxide catalyst based on the methanol introduced, a product containing largely $C_5$–$C_{33}$ primary straight chain saturated alcohols is formed. This subject matter is disclosed and claimed in the copending application of Michael Erchak, Jr., Serial No. 72,759, filed January 25, 1949, for "Alcohol Process."

We have now found that in reaction mixtures containing the above-identified alcoholic products, the products and excess alcohol reactant dissolve in the compressed ethylene of the vapor phase so that they do not separate out as a liquid phase even though much of the product would be liquid under the existing temperature and pressure conditions in the absence of ethylene. It is necessary to reduce the ethylene pressure considerably, we have found, in order to separate alcoholic products and excess alcohol reactant as a separate phase from the ethylene.

Moreover, we have found that reaction mixtures obtained by the above-noted process contain, even after the period of rapid reaction is over, reactive ingredients which can form undesired high molecular weight by-products; and that the reaction mixture containing ethylene and reaction products should be cooled down quickly below about 100° C. and below the initial reaction temperature of the catalyst (either simultaneously with pressure release, or before pressure release) to obtain a maximum proportion of product having carbon content below $C_{22}$. By "initial reaction temperature of the catalyst" we mean the temperature at which rapid reaction is first observed if the reaction mixture is heated up under reaction pressure.

Thus our invention is directed to the steps in recovering saturated monohydric alcohols of carbon content between $C_5$ and $C_{21}$ inclusive from alcohol-ethylene reaction mixtures containing $C_5$–$C_{21}$ alcohols and compressed ethylene, which comprise lowering the pressure on the reaction mixture to not more than about 500 p. s. i. and lowering the temperature of the reaction mixture from reaction temperatures to about 100° C. or below, and below the initial reaction temperature of the catalyst, during not more than about 5 minutes.

Our invention will be specifically illustrated and described with reference to the accompanying diagrammatic flow sheet representing a preferred embodiment of the process of our invention, but the invention is not to be understood as limited thereby.

In accordance with our process as illustrated in the flow sheet, ethylene is passed by way of line 1 and valve 2 to gas holder 3, whence it passes via valve 6 and line 7 to compressor 8. This compressor may be of any design suitable for obtaining high pressures; and may be combined if desired with a refrigerating system for liquefying ethylene so that liquid rather than gaseous ethylene is compressed.

From compressor 8, the ethylene passes via line 9 to preheater 15. The alcohol reactant, e. g. methanol, is introduced by pump 11 and line 12 into admixture with the ethylene in preheater 15. This mixture passes at approximately reaction temperature via line 16 and valve 17 to reaction zone 21. The polymerization catalyst, e. g. 30% aqueous hydrogen peroxide, is injected by pump 18 and line 19 into the reaction mixture just ahead of the reaction zone.

The reaction mixture is withdrawn by way of valve 22 and line 23 and is passed to a quick cooling zone 24 wherein the temperature is quickly lowered below 100° C. This quick cooling step may be effected by heat exchange, quenching, rapid expansion of gaseous reaction mixture, or the like; or by a combination of methods. The cooled reaction mixture is passed via valve 25 and valve 26 to separator 27 wherein pressures of about 1 atmosphere—500 p. s. i. and temperatures of about room temperature are maintained.

Gaseous ethylene is taken off in the separator via valve 28 and line 29 and products and unreacted alcohol are withdrawn via valve 31 and line 32 to still 36. In the still, unreacted alcohol (e. g. methanol) is taken off overhead as a forward flow stream through valve 34 and line 35. Reflux returns to the still via line 33.

The reaction products are removed from the still via valve 37 and line 38 and are passed to storage tank 39. From the storage tank the products pass via valve 41 and line 42 into still 45 in which alcohol products containing about 5–21 carbon atoms are taken off under vacuum overhead via valve 43 and line 44, while reflux returns to the still via line 50. The less volatile products, having carbon content above about $C_{21}$, are withdrawn from still 45 as residue via valve 46 and line 47.

Ethylene recovered in separator 27 is scrubbed, suitably with water, in tower 53 to remove methanol before compression and is recycled via line 4 and valve 5 to gas holder 3. A bleed is taken off from the recycle ethylene via valve 48 and line 49 to prevent build-up of impurities.

Scrubbing liquid from tower 53 is withdrawn via valve 54 and line 55 and is combined with recovered methanol from still 36 in storage tank 56. A bleed is taken off from storage tank 56 via valve 57 and line 58 for separation of scrubbing liquid; and methanol is recycled to the reaction via line 13 and valve 14.

Temperatures employed in producing $C_5$–$C_{21}$ alcohols, which are then recovered in accordance with our process, vary somewhat depending upon the catalyst chosen. More active catalysts in general call for use of lower reaction temperatures. The reaction temperatures used are at least about 50° C. above the initial reaction temperature of the catalyst, and are usually between about 200° C. and about 300° C., typically 240°–280° C. using hydrogen peroxide catalyst. Suitable pressures for the reaction are between about 1000 and 7500 pounds per square inch (absolute), typically 2000–4000 pounds per square inch using hydrogen peroxide catalyst.

The catalyst used in production of $C_5$–$C_{21}$ alcohols is a catalyst of the homopolymerization of ethylene, ineffective for promoting the Friedel-Crafts type reaction. A large number of catalysts of this class are known; they show in common the property of decomposing into or promoting the formation of free radicals. Among these catalysts hydrogen peroxide is especially suitable since it is found to bring about the desired reaction with ethylene at temperatures which are conveniently maintained, and to promote formation of products of the desired molecular weight in exceptionally high yields based both on the ethylene entering into reaction and on unit reaction space and reaction time.

Mol ratios of alcohol of carbon content not more than 8 carbon atoms and ethylene introduced as reactants generaly are within the range from about 1:1 to about 10:1 of alcohol : ethylene. A value between about 2:1 and 6:1 is particularly suitable when methanol is the alcohol employed.

Other alcohols which may be used include ethanol; propanol; isopropanol; normal-, iso-, sec.-, and tert.- butyl alcohol; amyl alcohols; cyclohexanol; and octyl alcohols.

We claim:

1. In the production of saturated monohydric alcohols of carbon content between $C_5$ and $C_{21}$ inclusive by reaction of a saturated monohydric alcohol containing not more than 8 carbon atoms and ethylene in the presence of a free radical forming catalyst of the homopolymerization of ethylene at temperatures between about 200° C. and about 300° C., pressures between about 1000 pounds per square inch and about 7500 pounds per square inch, and with a mol ratio of alcohol: ethylene introduced as reactants between about 1:1 and about 10:1, the improvement in recovery of $C_5$–$C_{21}$ alcoholic products of said reaction in the form of liquid phase mixtures which comprises lowering the pressure on the reaction mixture containing desired products below about 500 pounds per square inch and lowering the temperature of the reaction mixture during not more than about 5 minutes from reaction temperatures to not more than about 100° C. and below the initial reaction temperature of the catalyst.

2. An improved process in accordance with claim 1, wherein hydrogen peroxide is the reaction catalyst.

3. An improved process in accordance with claim 1, wherein hydrogen peroxide is the catalyst, methanol is the alcoholic reactant, reaction temperatures are between 240° C. and 280° C., reaction pressures are between 2000 and 4000 pounds per square inch and methanol : ethylene mol ratios are between 2:1 and 6:1.

MICHAEL ERCHAK, Jr.
FRANK PORTER.
CHARLES FORBES SILSBY.

References Cited in the file of this patent

UNITED STATES PATENTS

| Number | Name | Date |
|---|---|---|
| 2,391,218 | Bacon et al. | Dec. 18, 1945 |
| 2,402,137 | Hanford et al. | June 18, 1946 |
| 2,409,683 | Howk et al. | Oct. 22, 1946 |
| 2,411,158 | Hanford | Nov. 19, 1946 |
| 2,432,287 | Cramer | Dec. 9, 1947 |
| 2,517,732 | Stiteler et al. | Aug. 8, 1950 |